United States Patent [19]
Deutsch et al.

[11] Patent Number: 5,838,701
[45] Date of Patent: Nov. 17, 1998

[54] Q-SWITCHED SOLID-STATE LASER

[75] Inventors: Nils Deutsch, Göttingen; Thomas Schröder, Jena; Uwe Stamm; Wolfgang Zschocke, both of Göttingen, all of Germany

[73] Assignee: Lambda Physik Gesellschaft Zur Herstellung Von Lasern mbH, Germany

[21] Appl. No.: 803,119

[22] Filed: Feb. 20, 1997

[30] Foreign Application Priority Data

Feb. 29, 1996 [DE]   Germany .................. 196 07 689.7

[51] Int. Cl.⁶ ..................................................... H01S 3/11
[52] U.S. Cl. ........................... 372/10; 372/9; 372/18; 372/19; 372/43; 372/99; 372/106; 372/108
[58] Field of Search .................. 372/9, 10, 18, 372/19, 43, 44, 69, 70, 71, 72, 92, 98, 99, 108, 106

[56] References Cited

U.S. PATENT DOCUMENTS

| | | | |
|---|---|---|---|
| 4,918,704 | 4/1990 | Caprara et al. | 372/99 |
| 5,619,517 | 4/1997 | Dixon | 372/21 |
| 5,657,341 | 8/1997 | Hyuga | 372/98 |

FOREIGN PATENT DOCUMENTS 0378390   1/1990   European Pat. Off. ............. 372/10 X

OTHER PUBLICATIONS

K. Choi, S.H. Lin, E. Korevaar & C.S. Liu, "A Q–switched laser injection seeded by a rubidium absorption frequency matched diode laser," *Optics Communications*, vol. 88, No. 4.5.6, Apr. 1, 1992, pp. 385–390.

Company literature of the Lightwave Electronics Corp., Technical Information: "Introduction to Diode–Pumped Solid–State lasers", 1993, pp. 1 –16.

A.E. Siegman: "Lasers", University Science Books Mill Valley, California 1986, pp. 1034 –1039.

W. Koechner: "Solid–State Laser Engineering", Springer Verlag Berlin Heidelberg 1992, pp.246 –249.

Y.K. Park, G. Giuliani, R.L. Byer: "Stable single–axial–mode operation of an unstable–resonator Nd:YAG oscillator by injection locking", Opt. Lett 5, 96 (1980) pp. 96 –98.

(List continued on next page.)

*Primary Examiner*—Brian Healy
*Attorney, Agent, or Firm*—Limbach & Limbach L.L.P.

[57] ABSTRACT

A Q-switched solid-state laser has a narrow-band laser diode (18) whose narrow-band output radiation serves as seed radiation for exciting a solid (14), with the result that only a single wavelength-stable longitudinal mode oscillates in the resonator (10, 12) of the solid-state laser and corresponding radiation (16) is emitted.

4 Claims, 2 Drawing Sheets

OTHER PUBLICATIONS

L.A. Rahn: Feedback stabilization of an injection–seeded Nd: YAG laser, Appl. Opt. 24 940 (1995), pp. 940 –942.

R.Knappe, K.–J. Boller, R. Wallenstein: "Single–mode continuous–wave Cr:LISAF ring laser pumped by an injection locked 670–rm broad–area diode laser", Opt. Lett. 20m 1988 (1995), three (3) pages.

P.W. Smith: "Stabilized, single–frequency output from a long laser cavity", IEEE J. Quant. Elect. 1, 343 (1965), pp. 343 –348.

N.J. Vasa, M. Tanaka, T. Okada, M. Maeda, O. Uchino: "Comparative study of spectral narrowing of a pulsed Ti: Sapphire laser using pulsed and CW injection seeding", APPLIED PHYSICS B, 1996, vol. 62, pp. 51 –57.

M.D. Selker, R.S. Afzal, J.L. Dallas, A.W. Yu: "Efficient, diode–laser pumped, diode–laser–seeded, high–peak–power Nd: YLF regenerative amplifier", OPTICS LETTERS, Apr. 15, 1994, vol. 19, No. 18, pp. 551 –553.

A.W. Yu, M.A. Krainak and G.L. Unger: "1047 nm Laser Diode Master Oscillator Nd: YLF Power Amplifier Laser System", ELECTRONICS LETTERS, 1993, vol. 29, No. 8 pp. 678 –679.

J. Liang, J.P. Rosseau, P. Maine, A. Migus: "Demonstration of a tunable single longitudinal mode Q–switched solid––state source using injection seeded Nd:YAP", Opt. Comm., May 1, 1991, vol.29, No.5,6, pp. 509 & 513.

J.E. Bernard and A. J. Alcock: "High–repetition–rate––diode–pumped Nd: YVO4 slab laser", Opt. Lett. Nov. 15, 1994, vol. 19, No. 22, pp. 1861 –1863.

C.E. Hamilton, R.J. Beach, S.B. Sutton, L.H. Furu, and W. F. Krupke: "1–W average power levels and tunability from a diode–pumped 2.94 $\mu$m Er: YAG oscillator", Opt. Lett. Oct. 15, 1994, vol. 19, No. 20, pp. 1627 –1629.

Stephen A. Payne, Larry K. Smith, Laura D. DeLoach, Wayne L. Kway, John L. Kway, John B. Tassano, and William F. Krupke: "Laser, Optical, and Thermomechanical Properties of Yb–doped Fluorapatite", IEEE Journal of Quantum Electronics, vol.30, No. 1, Jan. 1994, pp. 170 –179.

Laura D. DeLoach, Ralph H. Page, Gary D. Wilke, Stephen A. Payne, and William F. Krupke: "Transition Metal–Doped Zinc Chalcogenides: Spectroscopy and Laser Demonstration of a New Class of Gain Media", IEEE Journal of Quantum Electronics, Jun. 1996, vol. 32, No. 6, pp. 885 –895.

T. D. Raymond and A.V. Smith: "Two–Frequency Injection––Seeded Nd: YAG Laser", IEEE Journal of Quantum Electronics, Oct. 1995, vol. 31, No. 10, pp. 1734 –1737.

Thomas J. Kane, Alan C. Nilsson, and Robert L. Byer: "Frequency stability and offset locking of a laser––diode–pumped Nd:YAG monolithic nonplanar ring oscillator", Opt. Lett., Mar. 1987, vol. 12, No. 3, pp. 175 –177.

10 ns

Q-SWITCHED SOLID-STATE LASER

BACKGROUND OF THE INVENTION

The invention relates to a Q-switched solid-state laser having at least one injection laser whose emitted narrow-band radiation is coupled into the solid as exciting injection radiation (seed radiation) and causes only a single wavelength-stable longitudinal mode to oscillate in the resonator of the solid-state laser.

Such Q-switched solid-state lasers are known (compare company literature on the Lightwave Electronics Corp., Technical Information: "Introduction to Diode-Pumped Solid-State lasers", 1993). In these known Q-switched solid-state lasers, powerful diode lasers are already being used to excite the lasing medium. A YAG laser or YLF laser, for example, serves as a solid-state laser.

If it is intended in this prior art to emit narrow-band radiation, a narrow-band seed radiation is coupled into the Q-switched solid-state laser, at least whenever the Q-switch is in the open position. The frequency of the seed laser is within the bandwidth of the pulsed laser resonator, and the Q-switched pulse is developed at a wavelength which corresponds to that longitudinal mode which is closest to the wavelength of the seed radiation. Serving there as an injection laser for generating the seed radiation (exciting injection radiation) is a nonplanar ring oscillator (NPRO). The "seeded" solid-state laser is a Q-switched Nd:YAG laser which is pumped by a further radiation source.

Such systems are extraordinarily complex since the laser used for the injection excitation (the "seeding") is already a complex, generally diode-pumped solid-state laser system which has a complicated (expensive) design and is difficult to stabilize.

A further prior art of relatively complicated lasers driven by exciting injection radiation (seed radiation) is described in the following publications: A. E. Siegman: "Lasers", University Science Books Mill Valley, Calif. 1986; W. Koechner: "Solid-State Laser Engineering", Springer Verlag Berlin Heidelberg 1992; Y. K. Park, G. Giuliani, R. L. Byer: "Stable single-axial-mode operation of an unstable-resonator Nd:YAG oscillator by injection locking", Opt. Lett 5,96 (1980); L. A. Rahn: "Feedback stabilization of an injection-seeded Nd: YAG laser", Appl. Opt. 24, 940 (1985).

In the publication by R. Knappe, K.-J. Boller, R. Wallenstein: "Single-mode continuous-wave Cr:LiSAF ring laser pumped by an injection locked 670-nm broad-area diode laser", Opt. Lett. 20, 1988 (1995), a diode-pumped Cr:LiSAF ring laser is described which is forced into unidirectional operation by a non-narrow-band diode. In unidirectional operation a ring laser always emits single mode operation for $TEM_{00}$. Furthermore this publication concerns a continuous (cw) laser, not a pulsed Q-switched laser.

It is known from the two abovementioned publications by A. E. Siegman and, respectively, W. Koechner to force a longitudinally single-mode laser operation by arranging specific wavelength-selective elements such as etalons or gratings in the resonator. However, particularly in the case of high-power lasers, such wavelength-selective elements show up considerable problems with regard to the stability of the emitted radiation and the durability of the wavelength-selective components. As a rule, these elements can be loaded with high power only for a short time. Again, the outlay on apparatus is considerable and adjustment is not simple.

In the publication by P. W. Smith: "Stabilized, single-frequency output from a long laser cavity", IEEE J. Quant. Electr. 1, 343 (1965), a spectrally very narrow-band laser operation is achieved by coupling a plurality of resonators to one another. Such systems also have complicated apparatus in order to achieve optimum coupling and to stabilize the coupled resonators so that the emitted wavelength remains constant.

In the journal APPLIED PHYSICS B, 1996, Vol. 62, pages 51–57, a Ti: Sapphire laser is shown in FIG. 5 which is not itself Q-switched and is excited by a broad-band Q-switched, frequency-doubled Nd:YAG laser, as well as being seeded by a narrow-band diode.

The journal OPTICS LETTERS, 1994, Vol. 19, No. 18, pages 551–553 shows a so-called regenerative laser amplifier which amplifies picosecond laser pulses (20 ps). These pulses are not narrow-band in the sense of the term "narrow-band" in accordance with the present application. In this article, the term "seed pulse" is employed in a different meaning than in the so-called "injection seeding" which is the subject-matter of the present application. In the article, a seed pulse is designated as a laser pulse which is coupled into the regenerative amplifier and is further only amplified. This pulse need not be narrow-band in the sense of the present patent application.

In the journal ELECTRONICS LETTERS, 1993, Vol. 29, No. 8, pages 678–679, an oscillator amplifier system is likewise described which is not narrow-band. There, as well, the term "seeding" is employed otherwise than in the present application specifically such as described above in relation to the article in OPTICS LETTERS, 1994, Vol. 19.

It is the object of the invention to provide a Q-switched solid-state laser of high power which has as little outlay on apparatus as possible and is of low complexity and which emits radiation at high power and with a long service life in only a single spectrally fixed longitudinal mode.

In the case of a Q-switched solid-state laser having at least one injection laser whose emitted narrow-band radiation is coupled into the solid as seed radiation, this object is achieved in that the injection laser generating the seed radiation is a narrow-band laser diode.

The subject-matter of the invention is thus a laser system having a Q-switched solid-state laser and a narrow-band laser diode whose emitted narrow-band radiation is coupled into the solid-state laser as exciting injection radiation (seed radiation) in such a way that the Q-switched solid-state laser emits radiation only in a single longitudinal mode. Thus, in the injection excitation (injection seeding) according to the invention a narrow-band laser impresses its spectral properties onto the oscillating laser. In this case, the excited solid-state laser oscillates only in a single longitudinal mode.

Thus, otherwise than in the nearest prior art explained at the beginning, the seed pulse is generated not by a further complicated laser, but by a miniaturized narrow-band compact laser light source, specifically a laser diode emitting in a narrow-band fashion directly (without additional wavelength-selective devices). Here, narrow-band means that the laser diode generates seed radiation with a bandwidth which is less than the mode spacing of the longitudinal modes of the Q-switched laser. The mode spacing is determined by the resonator length L. The mode spacing, that is to say the difference between the frequencies of two modes is given by the quotient of the speed of light and double the laser wavelength.

SUMMARY OF THE INVENTION

Thus, according to the invention, the spectrally narrow-band light of a laser diode is coupled into the solid-state laser resonator, with the result that an excitation is generated in the solid-state lasing medium which is above the level of spontaneous emission. The result of this is that the laser oscillates on only one longitudinal mode, specifically that whose wavelength corresponds to the wavelength of the laser diode. This is designated, also in German usage, as "injection seeding". In this case, the length of the laser resonator must be tuned exactly to the wavelength of the seed radiation.

Thus, the invention makes available an extremely compact and simply designed, Q-switched solid-state laser which emits in a narrow-band fashion by injection seeding, is simple (and cost effective) in terms of apparatus, is easy to adjust and has a very long maintenance-free service life.

Preferred refinements of the Q-switched solid-state laser according to the invention are described in the dependent claims.

BRIEF DESCRIPTION OF THE DRAWINGS

An exemplary embodiment of the invention is explained in more detail below with the aid of the drawing, in which.

DETAILED DESCRIPTION OF THE INVENTION

Figure 1:
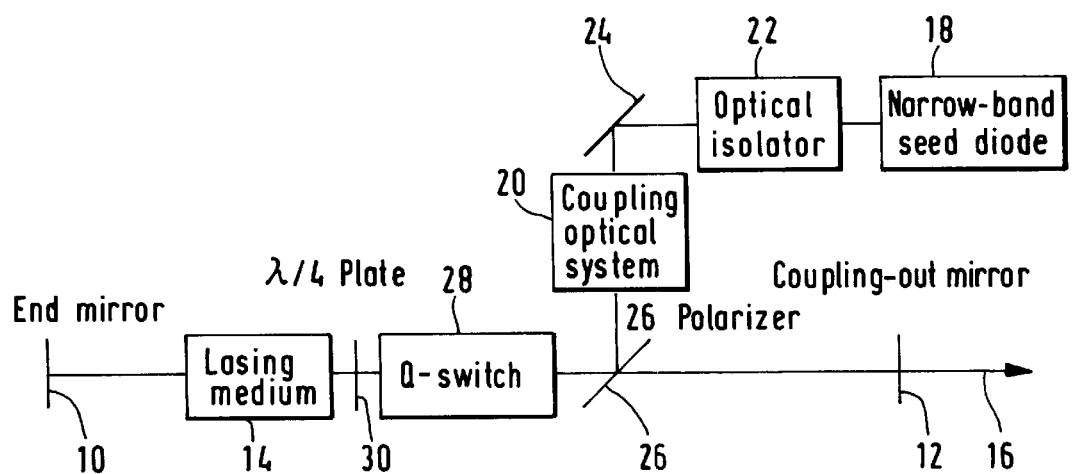
FIG. 1 shows diagrammatically a Q-switched solid-state laser according to the invention.

In accordance with FIG. 1, a solid-state laser has a resonator which is defined by an end mirror 10 and a coupling-out mirror 12. Arranged in the resonator is a lasing medium 14, for example imposed on Nd:YAG, Nd:YLF, Nd;YAP, Nd:Vanadat, Er:YAG, a Yb-doped fluorapatite crystal or Cr-doped ZnSe crystal.

Furthermore, a Q-switch 28 is arranged in the resonator 10, 12. The narrow-band radiation emitted by the resonator is denoted by the reference numeral 16.

A narrow-band laser diode is provided in order to effect injection excitation (injection seeding) in the lasing medium 14. Such narrow-band laser diodes can be obtained as prototypes, for example, from SDL under the type designation of SDL 6702-H1.

The radiation emitted by the narrow-band laser diode has a wavelength of 1064 nm with a bandwidth of approximately 3 MHz for example in the case of the use of Nd:YAG as material of the lasing medium 14.

In the exemplary embodiment in accordance with FIG. 1, the exciting radiation is deflected at a mirror 24 after passing an optical isolator 22 and coupled into the resonator via a coupling optical system 20. The coupling-in is performed by means of a polarizing beam splitter 26. The coupled-in radiation, reflected by the polarizing beam splitter 26, of the narrow-band laser diode 18 first traverses the Q-switch 28 and then a $\lambda/4$ plate 30, which produces circularly polarized light from linearly polarized light, and vice versa. Thereafter, the radiation enters the lasing medium 14 as seed radiation.

The wavelength of the narrow-band laser diode 18 is kept highly stable by a temperature control. The output power of the diode is selected to be so high that the seed radiation entering the lasing medium 14 in the way described forces the solid-state laser in the resonator 10, 12 to operate with only a single longitudinal-mode. Due to the rotation of the plane of polarization after twice passing through the $\lambda/4$ plate 30, the radiation oscillating in the resonator is not directed back into the coupling optical system 20, but towards the coupling-out mirror 12.

The emitted radiation 16 corresponds to a single longitudinal mode of the resonator.

Figure 2:
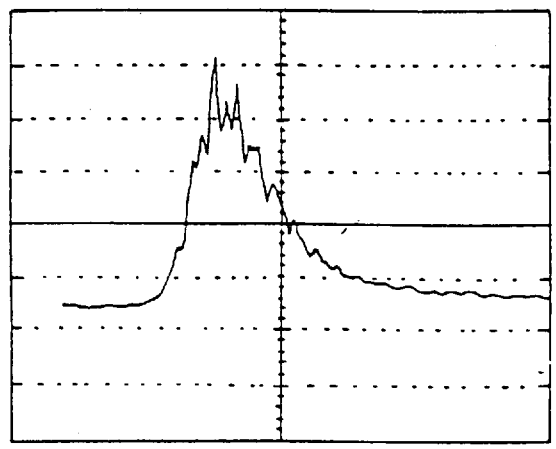
FIG. 2 and FIG. 3 show a comparison of the temporal characteristics of the pulse shapes of, on the one hand, a freewheeling Q-switched Nd:YAG laser (FIG. 2) and, on the other hand, the corresponding shape in the case of the coupling-in, according to the invention, of the radiation of a narrow-band laser diode (FIG. 3).
Figure 3:
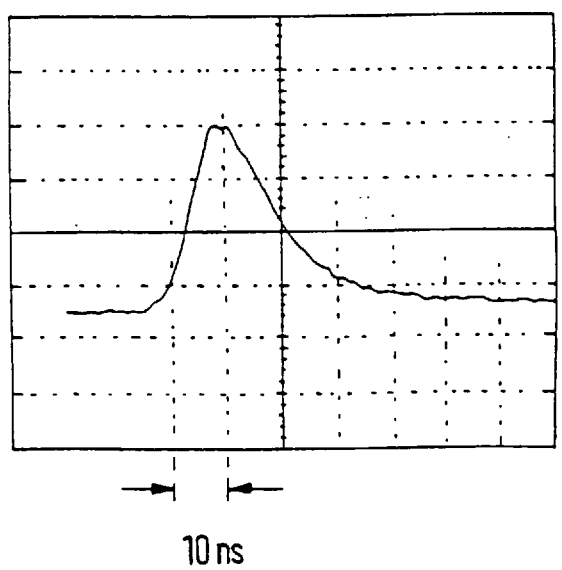

FIGS. 2 and 3 show the temporal characteristic of the pulse shapes, on the one hand of a freewheeling, Q-switched, Nd:YAG laser in accordance with the prior art (FIG. 2) and, on the other hand, the pulse shape of an appropriately Q-switched solid-state laser using a narrow-band laser diode according to the invention for the purpose of seeding (FIG. 3). One unit of the abscissa (time axis) corresponds to ten nanoseconds. The pulse shape in a solid-state laser according to the invention shows a substantially smoother ("modulation-free") characteristic.

We claim:

1. A laser system having a Q-switched solid-state laser without a wavelength-selective element in its resonator and a narrow-band laser diode whose emitted narrow-band radiation is coupled into the solid-state laser as exciting injection radiation (seed radiation) in such a way that the Q-switched solid-state laser emits radiation only in a single longitudinal mode.

2. The solid-state laser as claimed in claim 1, wherein an Nd:YAG crystal is provided as lasing medium in the Q-switched solid-state laser.

3. The solid-state laser as claimed in claim 1, wherein it has as lasing medium Nd:YLF, Nd:YAP, Nd:Vanadat, Er:YAG, Yb-doped fluorapatite crystals or Cr-doped ZnSe crystals.

4. The solid-state laser as claimed in claim 1, wherein the radiation of the laser diode is coupled into the resonator of the solid-state laser via a lens optical system, mirror optical system and/or fiber optical system.

* * * * *